(12) United States Patent
Matsuno et al.

(10) Patent No.: US 11,460,788 B2
(45) Date of Patent: Oct. 4, 2022

(54) IMAGE FORMING APPARATUS

(71) Applicants: Yasuhide Matsuno, Kanagawa (JP); Keiji Kunimi, Kanagawa (JP)

(72) Inventors: Yasuhide Matsuno, Kanagawa (JP); Keiji Kunimi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/407,209

(22) Filed: Aug. 20, 2021

(65) Prior Publication Data

US 2022/0066348 A1  Mar. 3, 2022

(30) Foreign Application Priority Data

Aug. 25, 2020 (JP) ................ JP2020-142097

(51) Int. Cl.
*G03G 15/01* (2006.01)
*G06F 3/12* (2006.01)
*G03G 15/08* (2006.01)

(52) U.S. Cl.
CPC ..... *G03G 15/0126* (2013.01); *G03G 15/0862* (2013.01); *G06F 3/121* (2013.01); *G06F 3/1208* (2013.01); *G06F 3/1235* (2013.01); *G03G 2215/0158* (2013.01)

(58) Field of Classification Search
CPC .......... G03G 15/0126; G03G 15/0862; G03G 2215/0158; G06F 3/1208; G06F 3/121; G06F 3/1235
See application file for complete search history.

(56) References Cited

U.S. PATENT DOCUMENTS

| | | | |
|---|---|---|---|
| 6,367,912 B1* | 4/2002 | Kishimoto | B41J 2/145 347/43 |
| 2005/0036798 A1* | 2/2005 | Mochizuki | G03G 15/0131 399/45 |
| 2006/0007465 A1* | 1/2006 | Hayashi | H04N 1/6027 358/1.13 |

(Continued)

FOREIGN PATENT DOCUMENTS

| | | | |
|---|---|---|---|
| JP | 5-066647 | 3/1993 | |
| JP | 3674334 B2 * | 7/2005 | ............ B41J 2/2107 |
| JP | 2006-106473 | 4/2006 | |

(Continued)

*Primary Examiner* — Ryan D Walsh
(74) *Attorney, Agent, or Firm* — Xsensus LLP

(57) ABSTRACT

An image forming apparatus includes an image forming device and circuitry. The image forming device forms an image with colorants of different colors. The circuitry determines whether there is a possibility that a shortage of a colorant adhesion amount occurs in primary-color image formation using a colorant of a primary color and cause the image forming device to perform two-color image formation in which only secondary-color image formation using a colorant of a secondary color different from the colorant of the primary color is added to the primary-color image formation using the colorant of the primary color to form an image to be formed with the colorant of the primary color, when the circuitry determines that there is a possibility that the shortage of the colorant adhesion amount occurs in the primary-color image formation using the colorant of the primary color.

8 Claims, 7 Drawing Sheets

(56) References Cited

U.S. PATENT DOCUMENTS

2011/0026082 A1* 2/2011 Miyadera .............. H04N 1/506
358/3.24
2013/0300797 A1* 11/2013 Azami .................. B41J 2/2107
347/105

FOREIGN PATENT DOCUMENTS

| JP | 3785775 B2 * | 6/2006 | |
|---|---|---|---|
| JP | 3914645 B2 * | 5/2007 | |
| JP | 2008-129086 | 6/2008 | |
| JP | 2016-147462 | 8/2016 | |
| WO | WO-2009136538 A1 * | 11/2009 | .......... B41J 2/04508 |

* cited by examiner

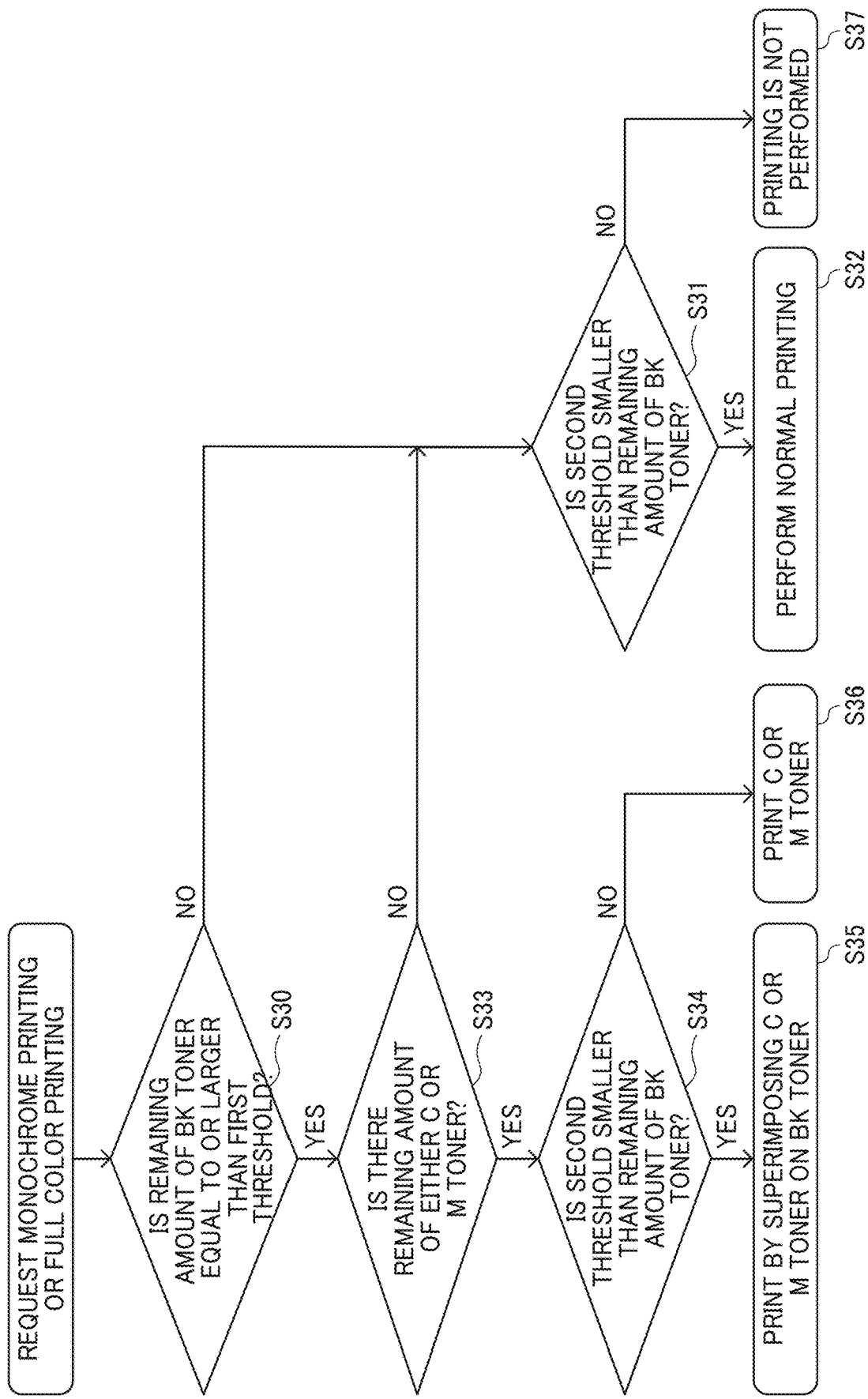

FIG. 4A
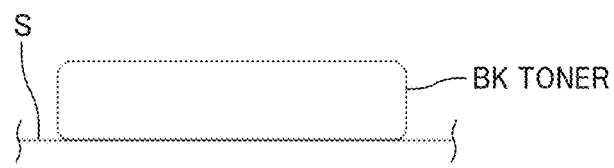
FIG. 4B
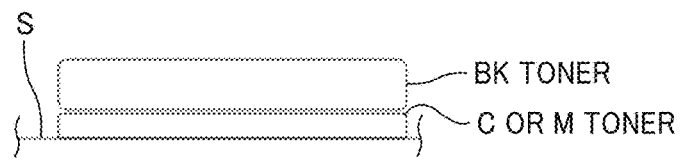
FIG. 4C
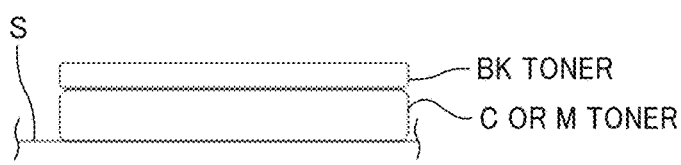
FIG. 5
|  |  | TRAVEL DISTANCE OR NUMBER OF SHEETS PRINTED | | |
|---|---|---|---|---|
|  |  | 0–X [km] | X–Y [km] | Y [km] – |
| ABSOLUTE TEMPERATURE | LOW | FIRST CONTROL | FIRST CONTROL | FIRST CONTROL |
|  | NORMAL | FIRST CONTROL | FIRST CONTROL | SECOND CONTROL |
|  | HIGH | FIRST CONTROL | SECOND CONTROL | SECOND CONTROL |

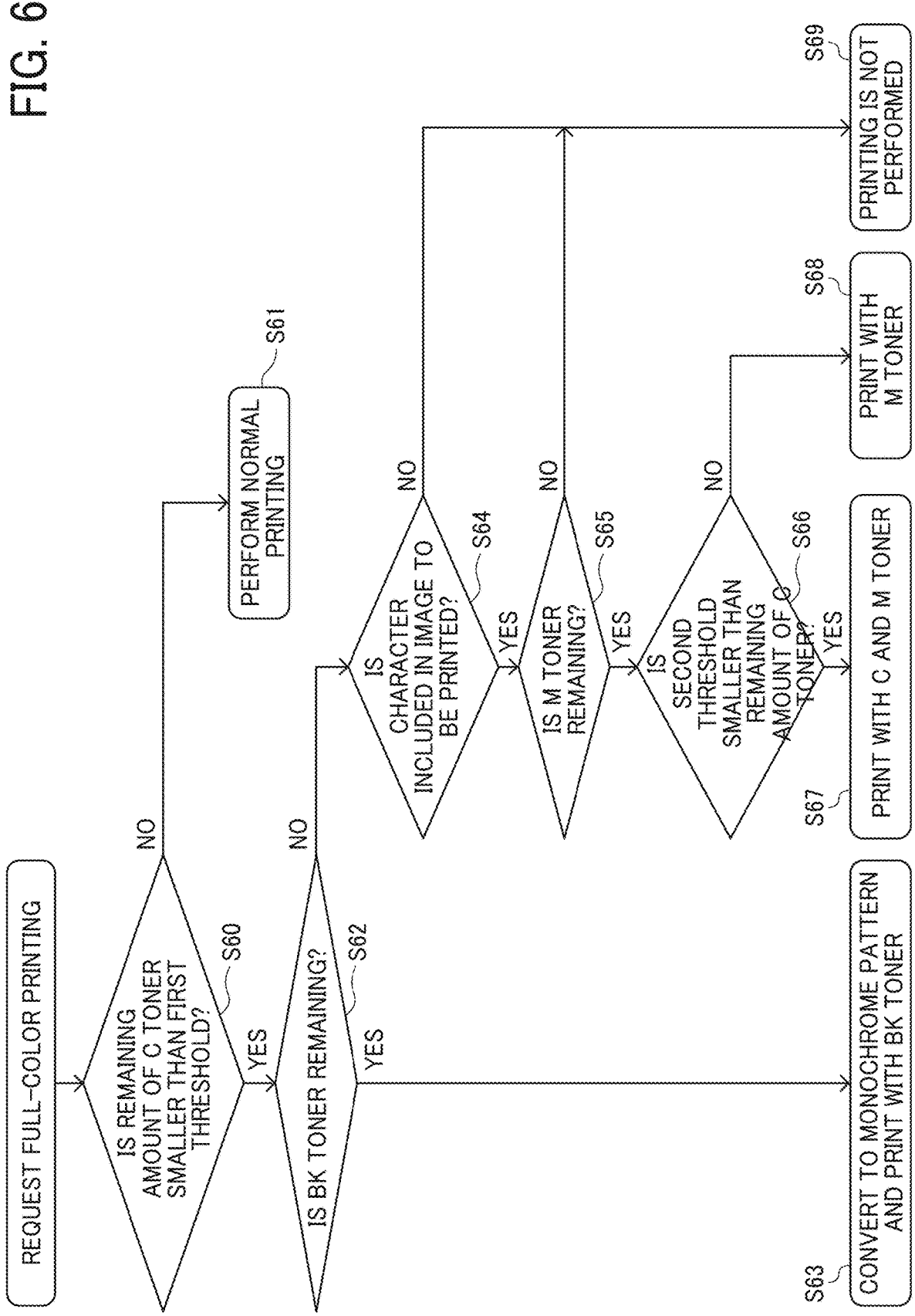

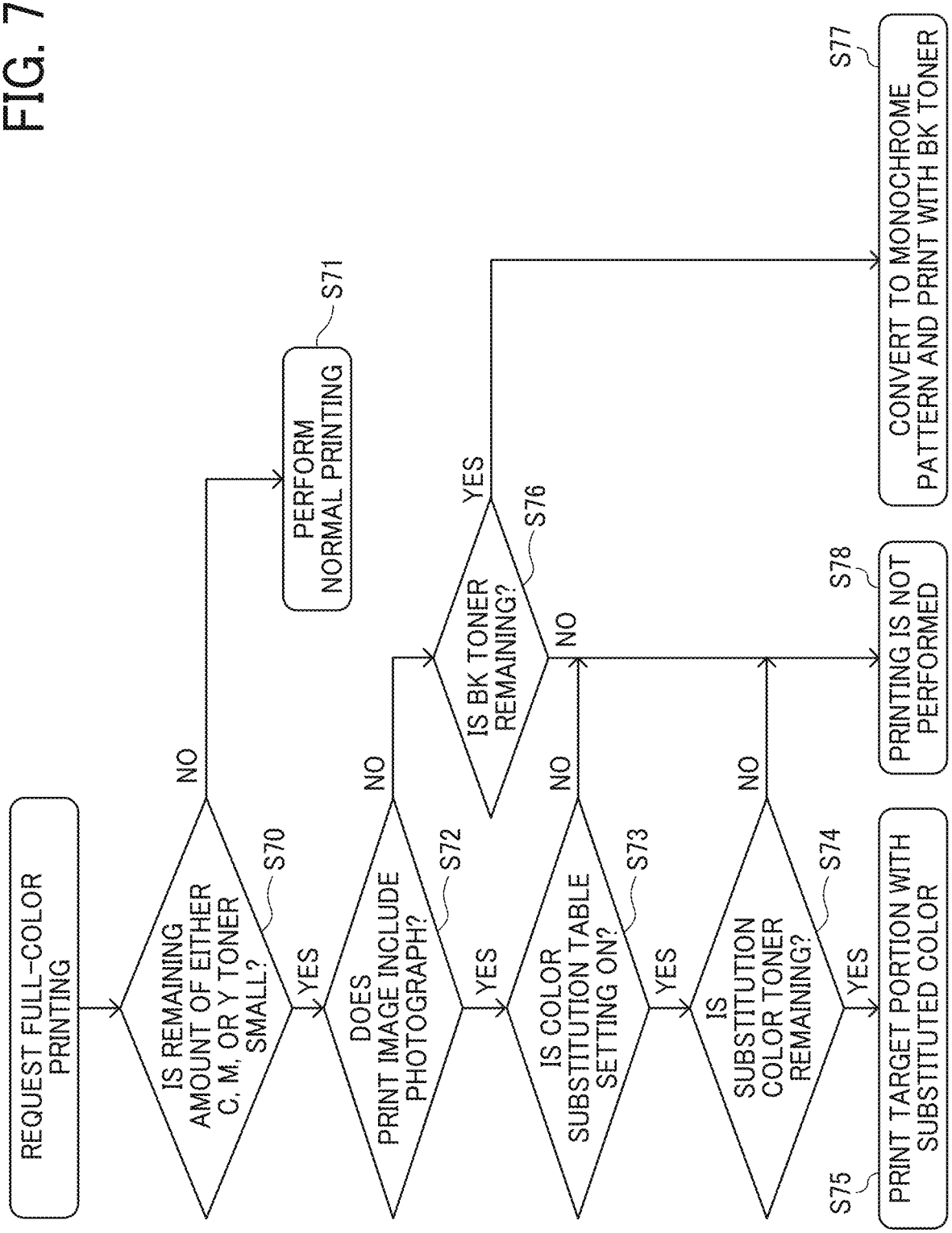

FIG. 8

| WHEN REMAINING AMOUNT OF COLOR TONER IS SMALL / RECOGNIZED IMAGE | | | PRINTER DRIVER SETTING | |
|---|---|---|---|---|
| CHARACTER | | | — | — |
| PHOTOGRAPH | LANDSCAPE | OUTDOOR (DAYTIME) | BRIGHT | DARK |
| | | OUTDOOR (NIGHTTIME) | BRIGHT | DARK |
| | | INDOOR | BRIGHT | DARK |
| | | IN WATER | BRIGHT | DARK |
| | | ANIMAL | BRIGHT | DARK |
| | | MACRO | BRIGHT | DARK |
| | PERSON | PORTRAIT | BRIGHT | DARK |
| | | SPORT | BRIGHT | DARK |
| | | CHILD | BRIGHT | DARK |
| | ARTIFACT | GOODS | BRIGHT | DARK |
| | | DISH | BRIGHT | DARK |
| | | ARCHITECTURE | BRIGHT | DARK |

IMAGE FORMING APPARATUS

CROSS-REFERENCE TO RELATED APPLICATION

This patent application is based on and claims priority pursuant to 35 U.S.C. § 119(a) to Japanese Patent Application No. 2020-142097, filed on Aug. 25, 2020, in the Japan Patent Office, the entire disclosure of which is hereby incorporated by reference herein.

BACKGROUND

Technical Field

Embodiments of the present disclosure relate to an image forming apparatus.

Description of the Related Art

There is known an image forming apparatus capable of forming an image using colorants of different colors.

For example, there is known such an image forming apparatus including an image processing device to continue printing with high image quality even when the remaining amount of black (Bk) toner is equal to or less than a predetermined amount. The image processing device includes a storage device for holding a print image of a color image including a black single color or a black plane color and a converter for converting print image data of the black plane held in the storage unit into print image data of each of a plurality of color planes based on a mask pattern different for each of the plurality of color planes. The image processing device uses a different mask pattern for converting print image data.

SUMMARY

In an aspect of the present disclosure, an image forming apparatus includes an image forming device and circuitry. The image forming device forms an image with colorants of different colors. The circuitry determines whether there is a possibility that a shortage of a colorant adhesion amount occurs in primary-color image formation using a colorant of a primary color and causes the image forming device to perform two-color image formation in which only secondary-color image formation using a colorant of a secondary color different from the colorant of the primary color is added to the primary-color image formation using the colorant of the primary color to form an image to be formed with the colorant of the primary color, when the circuitry determines that there is a possibility that the shortage of the colorant adhesion amount occurs in the primary-color image formation using the colorant of the primary color.

In another aspect of the present disclosure, an image forming apparatus includes an image forming device and circuitry. The image forming device forms an image with colorants of different colors. The circuitry determines whether there is a possibility that a shortage of a colorant adhesion amount occurs in primary-color image formation using a colorant of a primary color and causes the image forming device to form an image to be formed using at least two colorants including the colorant of the primary color and a colorant of a secondary color different from the colorant of the primary color, with only one colorant different from the colorant of the primary color, when the circuitry determines that there is a possibility that the shortage of the colorant adhesion amount occurs in the primary-color image formation using the colorant of the primary color.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is a flowchart of image formation control of an image forming apparatus when the amount of black toner is small according to an embodiment of the present disclosure;

FIGS. 4A, 4B, and 4C are diagrams illustrating how Bk toner and C or M toner are controlled to be superimposed on top of one another on a sheet according to an embodiment of the present disclosure;

FIG. 5 is a table of conditions for executing control, according to an embodiment of the present disclosure;

FIG. 6 is a flowchart of image formation control to be performed when the amount of color toner is small, according to an embodiment of the present disclosure;

FIG. 7 is a flowchart of alternative image formation control to be performed when the amount of color toner is small, according to an embodiment of the present disclosure; and FIG. 8 is a table illustrating a screen image of printer driver settings to determine how substitution control is to be performed when the remaining amount of color toner is small, according to an embodiment of the present disclosure.

Figure 1:
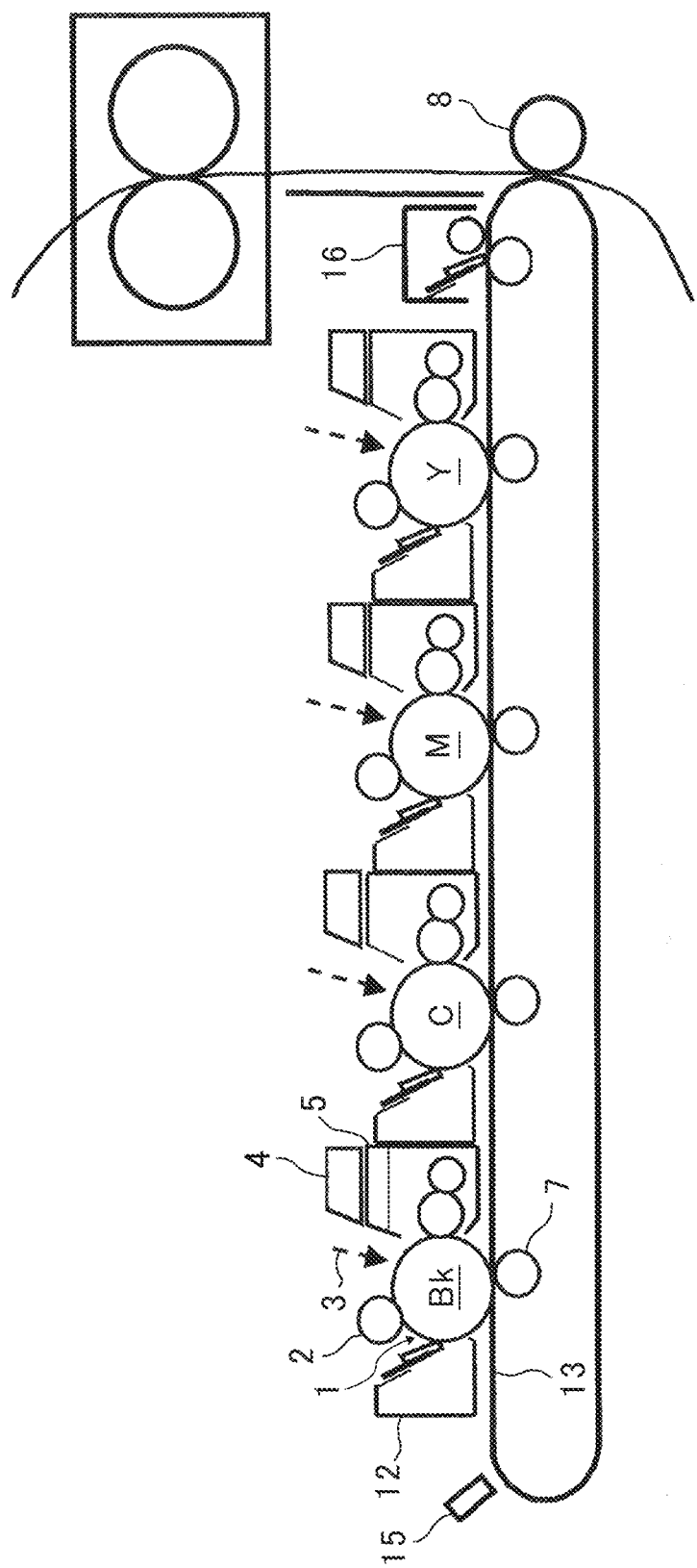
FIG. 1 is a schematic diagram illustrating a configuration of a relevant part of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

An embodiment of the present disclosure applied to a multifunction peripheral as an image forming apparatus is described below with reference to the drawings. First, an outline of a mechanical configuration and an electric and electronic system of the image forming apparatus is described.

FIG. 1 is a schematic diagram illustrating a configuration of a relevant part of an image forming apparatus according to the present embodiment.

The image forming apparatus according to an embodiment of the present disclosure employs a tandem type intermediate transfer method. Each of toner images of colors of black (Bk), cyan (C), magenta (M), and yellow (Y) is formed by corresponding one of image forming units Bk, C, M, and Y, respectively. The image forming units Bk, C, M, and Y have substantially a same configuration except that each of the colors of toners used is different.

Each of the image forming units Bk, C, M, and Y includes, around the corresponding one of photoconductor drums 1 as latent image bearers, a charger 2 that uniformly charges the surface of a corresponding one of the photoconductor drums 1 to a predetermined potential, an exposure device that emits writing light 3 for forming an electrostatic latent image on the charged surface of the corresponding one of the photoconductor drums 1, a developing device that adheres charged toner to the electrostatic latent image to form a toner image on the surface of the photoconductor drum 1, a transfer device 7 that transfers the toner image on the corresponding one of the photoconductor drums 1 to an intermediate transfer belt 13 as an intermediate transferor, and a cleaner 12 that removes transfer residual toner remaining on the corresponding one of the photoconductor drums 1 after transfer.

A replaceable toner supply container 4 containing toner therein is disposed above each of the developing devices 5. Each of the toner supply container 4 directly conveys toner discharged from the toner supply container 4 into the corresponding one of the developing devices 5. However, a supply path of toner may be provided in a body of the image forming apparatus and toner discharged from each of the toner supply containers 4 may be conveyed to the corresponding one of the developing devices 5 via the supply path.

The image formation according to the present embodiment is performed by a so-called negative-positive developing method in which the potential of an exposed portion of a photoconductor drum is lowered and toner is attached to the exposed portion. In the present embodiment, in each of the image forming units, the charger 2 uniformly charges the surface of the photoconductor drums 1 to a negative polarity, and the charged surface of the photoconductor drums 1 is irradiated with writing light 3 corresponding to the image data of each color to form an electrostatic latent image. Then, toner of each color on a developing roller of the developing device 5 is electrostatically adhered to an electrostatic latent image on the photoconductor drums 1 by the action of developing bias applied to the developing roller. Thus, a toner image of each color is formed.

Each of the toner images of the corresponding color thus formed is transferred onto the intermediate transfer belt 13 by the corresponding transfer device 7 so as to overlap each other. On the other hand, residual transfer toner not transferred from the photoconductor drums 1 to the intermediate transfer belt 13 is removed from the surface of each of the photoconductor drums 1 by the corresponding one of cleaners 12.

The composite toner image transferred onto the surface of the intermediate transfer belt 13 is conveyed to a secondary transfer portion of the intermediate transfer belt 13 facing a secondary transfer roller 8 by the rotation of the intermediate transfer belt 13. A recording sheet is fed from a sheet feeding tray to the secondary transfer portion at a timing when the composite toner image on the intermediate transfer belt 13 reaches the secondary transfer portion. Applying a transfer bias to the secondary transfer portion allows the composite toner image on the intermediate transfer belt 13 to be transferred onto the recording sheet at the secondary transfer portion. The residual transfer toner remaining on the intermediate transfer belt 13 after the transfer is removed by the belt cleaning device 16. The toner image transferred onto the recording sheet is fused onto the recording sheet by a fixing device 9 and the recording sheet is ejected from a sheet outlet outside of the image forming apparatus.

A sensor 15 in FIG. 1 serves as a toner adhesion amount detector to detect the toner adhesion amount of a toner patch for image density adjustment (described later) transferred onto the intermediate transfer belt 13. The sensor 15 is an optical sensor for detecting the toner adhesion amount based on the amount of light received when light emitted from a light emitting unit and reflected by the toner patch is received. In the present embodiment, a sensor that employs a combination of a specular reflection method and a diffuse reflection method is used as the sensor 15.

Figure 2:
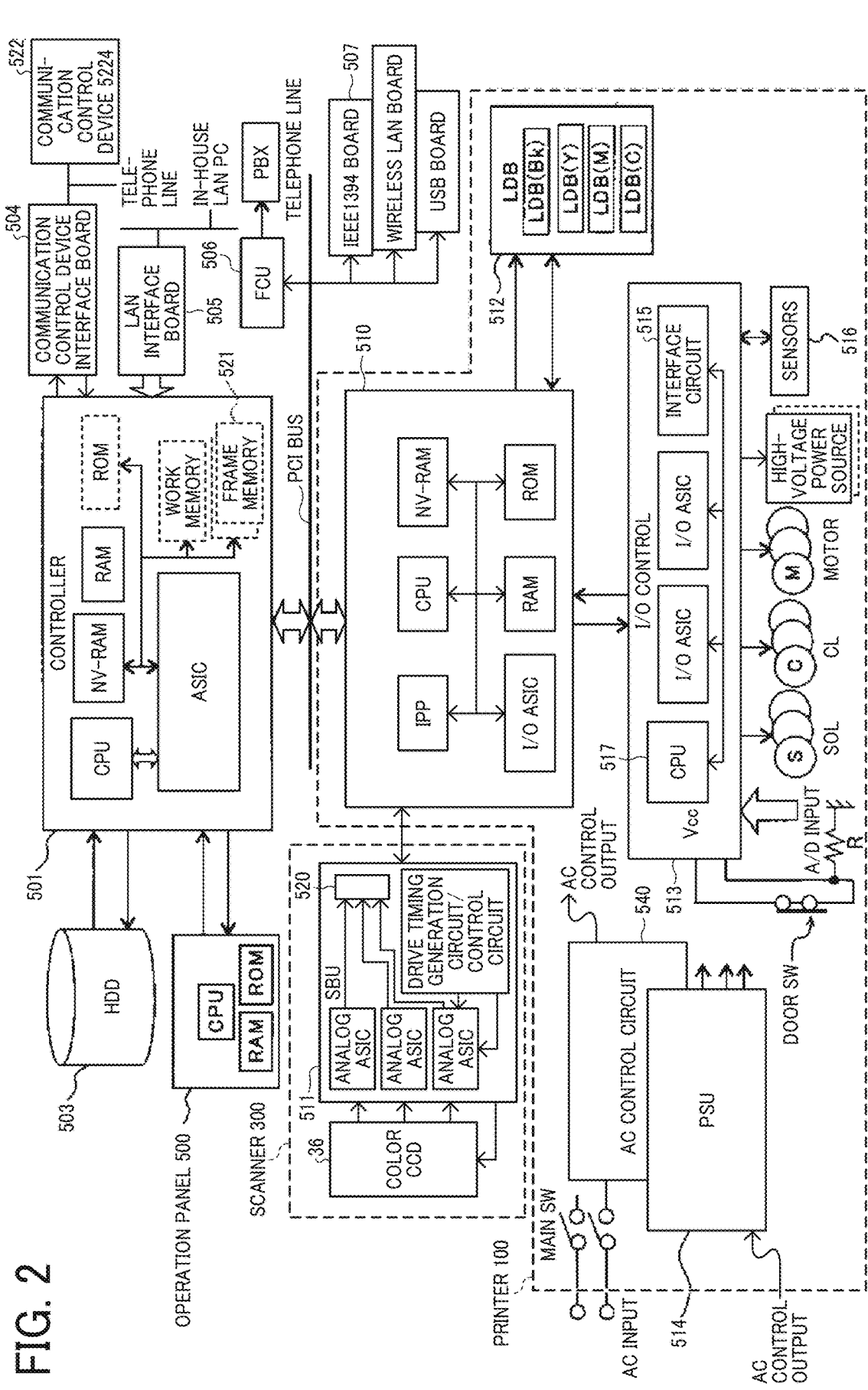
FIG. 2 is a block diagram of a system configuration of an electric and electronic system of an image forming apparatus according to an embodiment of the present disclosure.

FIG. 2 is a block diagram of a system configuration of an electric and electronic system of the image forming apparatus, according to the present embodiment.

The electric and electronic system includes a controller 501 that performs overall control of the image forming apparatus. The controller 501 is connected to an operation panel 500 of the image forming apparatus, a hard disk drive (HDD) 503 for storing image data, a communication controller interface board 504 for communicating with the outside of the image forming apparatus, and a local area network (LAN) interface board 505. The electric and electronic system also includes a FAX controller 506, an Institute of Electrical and Electronics Engineers (IEEE) 1394 board, a wireless LAN board, and a universal serial bus (USB) board 507 connected to a general-purpose PCI bus, and an engine controller 510 connected to the controller 501 via the general-purpose PCI bus. The engine controller 510 is connected to, for example, an input and output (I/O) control board 513 that controls I/O of the image forming apparatus, a scanner board (SBU) 511 as a sensor board unit that reads a document or image to be copied, a laser diode board (LDB) 512 that projects or optically writes image light represented by image data onto the photoconductor drums 1.

A scanner 300 that optically reads a document scans a light source for irradiating the document and forms an image of the document on a charge-coupled device (CCD) 36. A document image, in other words, reflected light of light irradiated on the document is photoelectrically converted by the CCD 36 to generate R, G, and B image signals. The CCD 36 is a 3-line color CCD, which generates R, G, and B image signals of even-numbered pixel channel (EVENch) and odd-numbered pixel channel (ODDch) and inputs the image signals to an analog application specific IC (ASIC) of the SBU 511. The SBU 511 includes the analog ASIC, a CCD, and a circuit for generating drive timing of the analog ASIC. The output of the CCD 36 is sampled and held by a sample-and-hold circuit inside the analog ASIC, then converted from analog to digital (A/D conversion), converted into R, G, and B image signals, subjected to shading correction, and sent to an image data processor (IPP) via an image data bus by an output interface (I/F) 520.

The IPP is a programmable arithmetic processing device that performs image processing. The IPP performs separation generation, which is an image area separation process to determine whether an image area is an area including characters or a photograph, background removal, scanner gamma conversion, filtering, color correction which converts the image data into Bk, Y, M, and C signals, scaling, image processing, gamma conversion, and gradation processing. The image data transferred from the SBU 511 to the IPP is corrected by the IPP for signal degradation (signal degradation of the scanner system) due to quantization into an optical system and a digital signal and is written into the frame memory 521.

The controller 501 includes a read only memory (ROM) for controlling a central processing unit (CPU) and the system controller board, a random access memory (RAM) serving as a working memory used by the CPU, a non-volatile random-access memory (NVRAM) having a built-in lithium battery, a built-in backup of the RAM, and a built-in clock, an ASIC for controlling the periphery of the CPU such as system bus control, frame memory control, and a first-in first-out (FIFO) control of the system controller board, and an interface circuit of the ASIC.

The controller 501 has functions of a plurality of applications such as a scanner application, a facsimile application, a printer application, and a copy application, and controls the entire system of the image forming apparatus. The controller 501 decodes the input of the operation panel 500 and displays the setting of the system and the state of the system on the display of the operation panel 500. A plurality of units is connected to the PCI bus, and image data and control commands are transferred in a time-division manner via an image data bus and control command bus.

The communication controller interface board 504 is a communication interface board between the communication controller and the controller 501. Communication of the communication controller interface board 504 with the controller 501 is connected via full-duplex asynchronous serial communication. A multi-drop connection between the communication controller interface board 504 and a communication controller 522 is established according to the RS-485 interface standard. Communication with a remote management device 630 is performed via the communication controller interface board 504.

The LAN interface board 505 is a communication interface board between a LAN and the controller 501 connected to, for example, an in-house LAN, and has a physical layer (PHY) chip mounted on the LAN interface board 505. The LAN interface board 505 and the controller 501 are connected by a standard communication interface of a PHY chip I/F and a I2C bus I/F. Communication with external devices is performed via the LAN interface board 505.

The HDD 503 is used as an application database for storing application programs of the electric and electronic system and device activation information of a printing device and an image forming device of the image forming apparatus, and an image database for storing image data of a read image and an image to be written, that is, image data and document data. Both the physical interface and the electrical interface conforming to AT attachment (ATA) and AT Attachment Packet Interface (ATAPI)-4 are connected to the controller 501.

A CPU, a ROM, a RAM, a liquid crystal display (LCD), and an ASIC (LCD Controller) for controlling key input are mounted on the operation panel 500. A control program of the operation panel 500 for controlling input reading and display output of the operation panel 500 is written in the ROM. The RAM is a working memory used by the CPU. Communication with the controller 501 allows to control input of the system settings by operating the panel and display and input for displaying the settings and status of the electric and electronic system to the user.

Each of the writing signals of the respective colors of Bk, Y, M, and C output from the work memory of the controller 501 is input to a writing circuit of corresponding one of laser diodes (LDs) of Bk, Y, M, and C of LDB 512. Each of the writing circuits of the LDs performs LD current control (modulation control) and outputs the result to each of the LDs.

The engine controller 510 is a process controller that mainly performs image formation control. The engine controller 510 includes a CPU, an IPP that performs image processing, a ROM in which a program necessary for controlling copying and printing, a RAM necessary for the control of the program, and an NV-RAM. The NV-RAM includes a static RAM (SRAM) and a memory for detecting power-off and storing data in an electrically erasable programmable read-only memory (EEPROM). An I/O ASIC included in the engine controller 510 includes a serial interface that transmits and receives signals to and from a CPU that performs other controls. The I/O ASIC is an ASIC that controls input and output signals of, for example, counters, fans, solenoids, and motors, on which an engine control board is mounted. The I/O control board 513 and the engine controller 510 are connected via a synchronous serial interface.

The I/O control board 513 includes a sub-CPU 517 mounted on the I/O control board 513 and performs I/O control of the image forming apparatus. The I/O control of the image forming apparatus includes reading of detected signals of temperature sensors, potential sensors, photoconductor density sensors (P sensors) serving as toner amount sensors, optical sensors serving as toner remaining amount detection sensors of the toner supply containers 4, and various other sensors. The I/O control of the image forming apparatus also includes analog control, jam detection with reference to detected signals of sheet sensors, and sheet conveyance control. An interface circuit 515 is an interface circuit that communicates with various sensors and actuators such as motor, clutch, and solenoid. The optical sensor serving as the toner remaining amount detection sensor described above is included in the various sensors 516.

A power supply PSU 514 is a unit that supplies power to control the image forming apparatus. When the main switch (SW) is turned on (closed), commercial power is supplied to the image forming apparatus. Commercial alternating current (AC) is supplied from the commercial power supply to an AC control circuit 540, and the power supply PSU 514 supplies a direct current (DC) required for each control board by using a controlled AC output, such as a rectified or smoothed AC output controlled by the AC control circuit 540. The CPU of each controller operates using the constant voltage generated by the power supply PSU 514.

Next, the image forming apparatus according to an embodiment of the present disclosure is described. The image forming apparatus according to the present embodiment, as a basic configuration of the image forming apparatus, can form an image using toners as colorants of colors different from each other. The image forming apparatus can form a full-color image and a two-color image. In addition, monochrome image formation and mono-color image formation are also possible. When an image printing apparatus such as a multifunction peripheral or a printer is used, printing is generally stopped and a prompt to replace the supply is displayed if the remaining amount of a supply (ink, toner, or the like) is small. In a case in which an image printing apparatus is capable of performing multi-color printing, a technology is known in which printing is performed using toner of a color other than the color of which the remaining amount has been small so that the printing operation is not stopped.

In the above-described known technology, a black color formed of Bk toner and a black color formed of three colors of Y, M, and C toner have a different color tone. Another known technology similar to the above-described known technology employs a composite black use mode in which a pixel to be formed with Bk toner is formed by overlapping a black colorant and composite black (a mixture of Y, M, and C), when the remaining amount of Bk toner is small. The ratio of toners of three colors of Y, M, and C for constituting the composite black is fixed. Accordingly, even if the remaining amounts of toners of the other two colors are sufficient, the composite black cannot be superimposed, due to the remaining amount of a color toner having the smallest remaining amount among toners of the three colors. Thus, using the three colors of Y, M, and C for the composite color at the fixed ratio has been a limitation in extending the period for continued printing.

In the present embodiment, there are provided a determiner and a controller for forming an image using Bk toner as a colorant of the primary color. The determiner determines whether there is a possibility that a colorant adhesion amount is insufficient. The controller controls such that an image is formed in a two-color image forming method in which only a second-color image forming of C or M toner as a colorant of a secondary color different from the colorant of the primary color is added for a first-image forming using the colorant of the primary color. The insufficient adhesion amount of the colorant causes image blurring or streaking. If image blurring or streaking occurs in an area of the image including important information such as characters, a serious print error may occur.

A toner remaining amount detector can be used as a determiner that determines whether there is a possibility that the colorant adhesion amount is insufficient. The toner remaining amount detector uses an optical sensor for detecting the remaining amount of each of color toners in the corresponding toner supply container 4, included in the various sensors 516 in FIG. 2. A counting method in which toner consumption is predicted by pixel counting and then the remaining amount of the toner supply container 4 is predicted, may also be employed.

In addition, an adhesion portion ratio detector that detects a ratio of a portion to which the colorant is to be adhered in the sub-scanning direction with respect to an image to be formed, may be employed as the determiner that determines whether there is a possibility that the colorant adhesion amount is insufficient. For example, in the developing device 5 which uses toner according to the present embodiment, even when the toner remaining amount of the toner supply container 4 of a certain color is sufficient, the ratio of the portion of the image to be formed by toner of the certain color may be large. Accordingly, the toner supply by the supply roller onto the developing roller of the developing device may not keep up and solid followability may be poor. Thus, the toner amount on the developing roller in a region on which the image is developed is insufficient, and image blurring or streaking may occur. The phenomenon as described above is likely to occur in one component development without using a carrier. A known adhesion portion ratio detector that detect a ratio of a portion to which toner is to be adhered may be used as the adhesion portion ratio detector in the sub-scanning direction. For example, a counter for image data generated by the IPP of the engine controller 510 in FIG. 2 can be used.

FIG. 3 is a flowchart of image formation control to be performed when the amount of black toner is small, according to the present embodiment.

When the remaining amount of toner is small, there is a risk that toner blurring or streaking may occur that may lead to image loss. Accordingly, as described in the flowchart of FIG. 3, the image forming apparatus includes the engine controller 510 to perform image forming control such that toner of another color is superimposed on Bk toner. As a result, toner blurring or streaking can be prevented from occurring when the remaining amount of Bk toner is small. More specifically, the flowchart relates to control to be performed when there is a print request using Bk toner in, for example, monochrome printing and full color printing. When the remaining amount of Bk toner is sufficient, more specifically, when the remaining amount of Bk toner is equal to or larger than a first threshold (NO in Step S30), it is determined in Step S31 that the remaining amount of Bk toner is larger than the second threshold which is smaller than the first threshold (YES in Step S31). Accordingly, normal printing is performed (Step S32). In other words, Bk toner is used as in normal printing and an image portion to be printed with Bk toner is printed with Bk toner.

When the remaining amount of Bk toner decreases due to consumption and falls below the first threshold (YES in Step S30), whether there are sufficient amounts of C and M toner is determined based on the output from the remaining amount detection sensor of C and M toner (Step S33). When the remaining amount of any one of C and M toner (YES in Step S33), whether the remaining amount of Bk toner is larger than the second threshold is determined (Step S34). If it is determined that the remaining amount of Bk toner is larger than the second threshold, C toner or M toner is superimposed on Bk toner in the printing (Step S35). More specifically, an image to be formed with Bk toner is formed with Bk toner and one of C toner and M toner is superimposed on the Bk toner in the printing. When the IPP of the engine controller 510 of FIG. 2 generates Bk, Y, M, or C signals to be written into the frame memory 521, a process is performed such that C or M toner is also superimposed on Bk toner in the printing. A selector may be provided, for example, through the operation panel 500 to enable selection as to which of C and M toner is to be superimposed on Bk toner in the printing. Such a mechanism as described above enables an image output to be consistent with the user's preference or taste of color tone.

If it is determined that the remaining amount of Bk toner is equal to or less than the second threshold (NO in Step S34), C or M toner is used to perform printing without using Bk toner (Step S36). In other words, an image to be formed with Bk toner is printed only with C or M toner. When the IPP of the engine controller 510 of FIG. 2 generates Bk, Y, M, or C signals to be written into the frame memory 521, only the C or M signal is written into the frame memory 521 for Bk pixels. The printing continuity is given priority over the color tone in printing of Step S36.

When it is determined that the remaining amount of either one of C toner and M toner is insufficient (NO in Step S33), whether the remaining amount of Bk toner is larger than the second threshold is determined (Step S31). When it is determined that the remaining amount of Bk toner is larger than the second threshold is determined (YES in Step S31), normal printing is performed (Step S32). If it is determined that the remaining amount of Bk toner is not larger than the second threshold (NO in Step S31), it is determined that the remaining amount of Bk toner is also insufficient or the remaining amount of Bk toner is already empty and that there is a risk that toner blurring or streaking may occur. Accordingly, no printing is performed (Step S37). A message or warning that the amount of Bk toner is insufficient is displayed on the operation panel 500 for the user. When a print instruction is issued via the network, in addition to or instead of the print instruction, a notification that the remaining amount of Bk toner is insufficient is sent via the network.

As described above, in a state in which there is a possibility that toner blurring or streaking may occur, that is, in a case in which the remaining amount of Bk toner is less than the first threshold, printing is performed with C or M toner superimposed on Bk toner. When Bk toner and toner other than Bk toner are superimposed on each other, a change in color tone can be restrained by applying Bk toner as toner fixed on an outermost surface of the sheet. In other words, preferably, an image formation using a primary color and an image formation using the secondary color are performed such that the colorant of the primary color is positioned on the colorant of the secondary color on a sheet which is a medium on which the image is formed.

When the Bk image forming unit is disposed as illustrated in FIG. 1, Bk toner is positioned on an uppermost surface of the intermediate transfer belt 13. Accordingly, Bk toner is positioned on a lowermost layer of the sheet when Bk toner is transferred onto the sheet. Accordingly, to form Bk toner on the outermost surface of the sheet, the mounting position of the Bk image forming unit is set at least upstream in the conveyance direction of the intermediate transfer belt 13 than the position of C or M toner which are superimposed on Bk toner. The mounting position of the Bk image forming unit is set upstream in the conveyance direction of the intermediate transfer belt 13 than the position of C, M, and, for example, Y toner.

The second threshold is, basically, recommended to be set to zero and when the remaining amount is 0, there is no toner. However, an error may occur depending on the toner remaining amount detection method. For example, when the remaining amount of toner is detected by the counting method in which toner consumption is predicted by pixel count and then the remaining amount of toner is predicted from the toner consumption, a difference may occur between the actual remaining amount of toner and the calculated remaining amount of toner. The second threshold may be determined based on an error of the difference between the actual remaining amount of toner and the calculated remaining amount of toner. For example, when a difference of 10 grams occurs due to an error, the second threshold is set to −10 grams so that Bk toner is placed on the outermost surface as much as possible.

FIGS. 4A, 4B, and 4C are diagrams illustrating how Bk toner and C or M toner are controlled to be superimposed on top of one another, according to the present embodiment.

FIG. 4A illustrates a state in which normal printing is performed using only Bk toner. FIGS. 4B and 4C illustrate a state in which C or M toner is superimposed on Bk toner. S denotes a sheet onto which toner is attached. In FIG. 4B, the amount of Bk toner is larger than the amount of Bk toner in FIG. 4C. In this way, the ratio between Bk toner and the other color toner is changed according to the remaining amount of Bk toner. More specifically, as the remaining amount of Bk toner decreases, the amount of Bk toner is controlled to be reduced from first control in which C or M toner are superimposed on Bk toner as illustrated in FIG. 4B to second control illustrated in FIG. 4C. In other words, the image forming apparatus includes the toner remaining amount detector that detects the remaining amount of the colorant (Bk) of the primary color and the controller adjusts the ratio between the amount of the colorant of the primary color used in the image formation using the primary color and the amount of the colorant (C or M) of the secondary color used in the image formation using the secondary color according to the remaining amount of Bk toner. Such a control as described above allows both the maintenance of the color tone and restraining of the risk of toner blurring or streaking to be achieved. In other words, superimposing only a necessary amount of toner in accordance with the remaining amount of Bk toner allows the reproducibility of image to be ensured.

In addition, when the ratio of Bk toner in the sub-scanning direction is large, performance of Bk toner to follow solid image is deteriorated. Accordingly, toner blurring or streaking is likely to occur downstream in the sub-scanning direction. When the Bk toner ratio in the image sub-scanning direction is large, changing the ratio of C or M toner superimposed on Bk toner depending on the position of the image in the sub-scanning direction allows to ensure the performance of Bk toner to follow solid image regardless of the position of the image. For example, when the printing rate in the sub-scanning direction is low (printing rate is smaller than a threshold value), the first control of FIG. 4B is adopted. On the other hand, when the printing ratio in the sub-scanning direction is high (printing ratio is equal to or larger than the threshold value), the second control of FIG. 4C is adopted. As described above, the ratio of which Bk toner and C or M toner are superimposed is changed. In other words, the image forming apparatus includes an adhesion portion ratio detector that detects a ratio of a portion to which the colorant is to be adhered in the sub-scanning direction in an image to be formed with the colorant of the primary color (Bk) and the controller adjusts a ratio of an amount of the colorant of the primary color used in the image formation using the primary color and an amount of the colorant of the secondary color (C or M) used in the image formation using the secondary color according to the ratio of the portion to which the primary color is to be adhered.

Further, in a high-temperature and high-humidity environment or in a state in which the operational life of the developing unit is ending, the chargeability of toner decreases and the performance of toner to follow solid image deteriorates. The ratio of C or M toner superimposed on Bk toner is changed by referring to information such as temperature, humidity, the number of sheets printed by the developing unit, and a traveling distance of the developing unit. As a result, the performance of toner to follow solid image can be ensured regardless of the use state of the image forming apparatus.

FIG. 5 is a table of conditions for executing control, according to the present embodiment.

For example, as illustrated in the table of FIG. 5, under conditions of high temperature and high humidity in which the performance of Bk toner to follow solid image is deteriorated and under conditions in which the travel distance of the developing unit is long, the amount of Bk toner adhered is small to reduce the risk of toner blurring or streaking. In the table of FIG. 5, "first control" corresponds to a condition illustrated in FIG. 4B, and "second control" corresponds to a condition illustrated in FIG. 4C. The absolute humidity can be calculated from the temperature and humidity information. For this purpose, an environment sensor for measuring temperature and humidity is used. In other words, the determiner includes at least one of the environment detector and the operational life detector of the image forming unit. The controller adjusts the ratio between the amount of the colorant of the primary color used in the image formation using the primary color and the amount of the colorant of the secondary color used in the image formation using the secondary color in accordance with the detection result of the environment detector or the operational life detector. As described above, superimposing C or M toner on Bk toner allows to improve the performance of Bk toner to follow solid image in a high-temperature and high-humidity environment in which the performance of Bk toner to follow solid image is deteriorated or in a state in which the operational life of the developing unit is ending.

FIG. 6 is a flowchart of image formation control to be performed when the amount of color toner is small, according to the present embodiment.

The toner blurring or streaking may occur also when the remaining amount of color toner is small. There are several methods to prevent the toner blurring or streaking from occurring. As an example, FIG. 6 illustrates a control flow of image formation when the remaining amount of C toner is small. When the remaining amount of C toner is small, the print mode is converted into a black and white print mode to perform printing. In other words, a color image pattern is converted into a monochrome image pattern for printing. In other words, in the image formation using C toner which is the colorant of the primary color, when it is determined that there is a possibility that a shortage of the colorant adhesion amount may occur due to a shortage of the remaining amount of C toner, formation of a full color image, which is an image to be formed using at least two colorants of the colorant of the primary color and the colorant of the secondary color different from the colorant of the primary color, is performed by image formation of only one color of Bk toner which is the colorant different from the colorant of the primary color. When there is no remaining amount of Bk toner, control is performed such that the color toner and toner of another color are superimposed only on a character portion of the image with respect to the color toner having an insufficient remaining amount.

In FIG. 6, when the remaining amount of C toner is sufficient, in other words, when the remaining amount of C toner is equal to or larger than the first threshold (NO in Step S60), the normal printing is performed (Step S61). In other words, C toner is used as in normal printing to perform printing such that an image portion to be formed with C toner is formed with C toner.

When the amount of C toner decreases due to consumption and falls below the first threshold (YES in Step S60), it is determined from the output of the remaining amount detection sensor of Bk toner whether there is a remaining amount of Bk toner (Step S62). When there is the remaining amount of Bk toner (YES in Step S62), a color image pattern is converted into a monochrome pattern and printed with Bk toner (Step S63). A full color mode is switched to a monochrome mode and substituting a gradation pattern of Bk toner to prevent the occurrence of toner blurring or streaking. In generating the Bk, Y, M, and C signals to be written into the frame memory 521 by the IPP of the engine controller 510 in FIG. 2, the CMY data is converted into the Lab color space data, and only data of the Bk signal is generated based on a luminance L.

When it is determined that there is no remaining amount of Bk toner (NO in Step S62), whether an image to be formed with C toner having a small remaining amount includes a character portion is determined (Step S64). The IPP of the engine controller 510 in FIG. 2, may be used as a character portion extraction unit to determine whether the character portion is included in the image and to identify the location of the character portion. When it is determined that a character portion is included in the image (YES in Step S64), whether there is a remaining amount of M toner that serves as the secondary color when C toner is the primary color is determined (Step S65). When it is determined that there is the remaining amount of M toner (YES in Step S65), whether the remaining amount of C toner is larger than the second threshold is determined (Step S66). If it is determined that the remaining amount of C toner is larger than the second threshold, printing is performed such that M toner is superimposed on the character portion formed with C toner (Step S67). In other words, M toner is superimposed on C toner to print the character portion of the image to be formed with C toner. In other words, two colors are printed only on the character portion identified by the character portion extracting unit. When the Bk, Y, M, and C signals to be written to the frame memory 521 are generated by the IPP of the engine controller 510 in FIG. 2, processing is performed such that M toner is also superimposed on the pixels of the image formed with C toner.

If it is determined that the remaining amount of C toner is equal to or less than the second threshold (NO in Step S66), M toner is used to perform printing without using C toner (Step S68). In other words, an image to be formed with C toner is printed with only M toner. When the Bk, Y, M, and C signals to be written to the frame memory 521 are generated by the IPP of the engine controller 510 in FIG. 2, only the M signal is written onto the pixels of the character portion formed with C toner. Printing continuity is given priority over the color tone in printing of Step S68. Printing in Step S67 or Step S68 is performed to avoid a print error due to toner blurring or streaking in the character portion. Performing control to superimpose colors only in the character portion for the reason that image loss is not allowed in the character portion, such as a decimal point disappears and a high level of reproducing the color tone is not normally required, allows to take minimum measures against toner blurring or streaking.

When it is determined that the image to be formed with C toner does not include a character portion (NO in Step S64), or when it is determined that there is no remaining amount of M toner (NO in Step S65), it is determined that the toner blurring or streaking may occur and the printing is not performed (Step S69). A message indicating there is no remaining amount of C toner is displayed on the operation panel 500 for the user. When a print instruction is issued via the network, in addition to or instead of the message described above, a message indicating, for example, there is no remaining amount of C toner such as absence of C toner is notified via the network.

As described above, superimposing other color toner on Bk toner only in the character portion to prevent toner blurring or streaking may lead to an image loss in the character portion, for example, an image loss of a decimal point of a bill, and may become a major liability for damages. On the other hand, the requirement level of reproducing the color tone of the character portion is lower than the requirement level of reproducing the color tone of the image portion. Accordingly, the above-described method of preventing the toner blurring or streaking by performing printing of other color toners only for the character portion is a reasonable compromise between the image loss risk and the requirement level of reproducing the color tone for the character portion.

FIG. 6 is a flowchart of image formation control to be performed when the remaining amount of C toner is small, according to the present embodiment. By contrast, when the remaining amount of M toner is small and the remaining amount of M toner is smaller than the first threshold (Step S60) and there is no Bk toner, M toner whose remaining amount is insufficient and C toner that serves as alternative color toner are combined only for the character portion (Step S67, Step S68). When the remaining amount of Y toner is small and the remaining amount of Y toner is smaller than the first threshold in (Step S60) and when there is no Bk toner, for example, Y toner whose remaining amount is insufficient and alternative color toner are combined only for the character portion (Step S67 and Step S68). In such control, some of Y toner is substituted with one of C toner and M toner whose remaining amount is greater than the other.

FIG. 7 is a flowchart of alternative image formation control to be performed when the amount of color toner is small, according to the present embodiment.

In such image formation control, when a photographic portion is included in the image to be formed by the color toner whose remaining amount is insufficient (YES in Step S70 and YES in Step S72) and the following pair of conditions are satisfied, the image of such a photographic portion to be formed by the color toner whose remaining amount is insufficient is formed only by alternative color toner. The pair of conditions include a condition that the setting of a color tone substitution table, as will be described later in detail, is turned on (YES in Step S73) and a condition that the remaining amount of substitution toner is sufficient (YES in Step S74). If either of the two conditions is not satisfied (NO in Step S73 or Step S74), printing is stopped (Step S78), and predetermined display or notification is issued.

When the image formed with the color toner of insufficient remaining amount does not include the photographic portion (NO in Step S72) and when there is a remaining amount of Bk toner (YES in Step S76), the color image pattern is converted into a monochrome pattern and printed (Step S77). When there is no remaining amount of Bk toner (NO in Step S76), printing is stopped (Step S78), and a predetermined display or notification is performed.

The color tone substitution table is as follows. In general, when a photographic image is printed with toner of another color other than a color normally used, the color tone of the photographic image changes. However, even if the color tone changes depending on the subject of a photographic image, substituting, for example, M toner depicting the human skin with Y toner, and C toner depicting the night sky with Bk toner may facilitate the subject to be recognized without a sense of discomfort. Providing a recognizing mechanism for recognizing what is represented in a photograph allows printing to be performed with a substitute pattern in accordance with the recognized result. The color tone substitution table stores the substitute pattern in accordance with the recognized result. The substitute pattern in accordance with the recognized result is determined based on the color tone substitution table. If the color tone substitution table can be customized, for example, by adjusting a printer driver setting, printing in accordance with a user's preference can be performed. Whether the setting of the color tone substitution table is turned on (Step S73) can be determined depending on whether the use of the setting content is requested for printing in the printer driver setting.

FIG. 8 is a table illustrating a screen image of printer driver settings to determine how substitution control is to be performed when the remaining amount of color toner is small, according to the present embodiment.

As illustrated in FIG. 8, a bright setting (M toner and Y toner as substitute toner) or a dark setting (C toner and Bk toner as substitute toner) can be selected through the printer driver setting. Based on the type of the recognized image and the set color tone substitution table, substitution control to be performed when the remaining amount of toner is small is determined. For example, when the bright setting (M toner and Y toner as the substitute toner) is selected for indoor landscape and the remaining amount of M toner is small, an indoor portion of an image using M toner is formed with Y toner that is a substitute of M toner. When the bright setting (M toner and Y toner as substitute toner) is selected for indoor landscape, the indoor portion using C toner is not substituted with Bk toner even when the remaining amount of C toner is small. In other words, even when the remaining amount of C toner is small, the selection of toner is not changed to the selection of dark setting for indoor landscape.

A technology for recognizing a person or a landscape in an imaging technology used for such as a digital camera can be used to recognize the type of the image. In particular, preferably, a technology using an artificial intelligence (AI) that recognizes the type of the image is used. A recognizing unit using the above-described technologies serves as a determining unit that extracts a photograph portion in an image and determines a subject of the extracted photograph portion.

In the control of FIG. 7, 100% of the color toner with a small remaining amount is substituted with toner of another color. However, if a color toner with a small remaining amount remains, the color toner may be substituted with two colors in the same manner as the two-color image forming of the previous example. In this case, the storage device that extracts a photograph portion in an image and stores information of a combination of a primary color and a secondary color for each subject in the extracted photograph portion serves as the color tone substitution table. The two-color image forming method is performed on the part of the subject recognized based on stored information in the storage device.

In the above descriptions, the term "printing" in the present disclosure may be used synonymously with, e.g. the terms of "image formation", "recording", "printing", and "image printing".

The suffixes Y, M, C, and K attached to each reference numeral indicate only that components indicated thereby are used for forming yellow, magenta, cyan, and black images, respectively, and hereinafter may be omitted when color discrimination is not necessary.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus, comprising:
an image former to form an image with colorants of different colors; and
circuitry configured to:
determine whether there is a possibility that a shortage of a colorant adhesion amount occurs in primary-color image formation using a colorant of a primary color; and
cause the image former to perform two-color image formation in which only secondary-color image formation using a colorant of a secondary color different from the colorant of the primary color is added to the primary-color image formation using the colorant of the primary color to form an image to be formed with the colorant of the primary color, when the circuitry determines that there is a possibility that the shortage of the colorant adhesion amount occurs in the primary-color image formation using the colorant of the primary color,
wherein the circuitry is configured to detect a ratio of a portion to which the colorant of the primary color is to be adhered in a sub-scanning direction in the image to be formed with the colorant of the primary color, and
wherein the circuitry is configured to adjust a ratio between an amount of the colorant of the primary color used in the primary-color image formation and an amount of the colorant of the secondary color used in the secondary-color image formation, according to the ratio of the portion to which the colorant of the primary color is to be adhered.

2. The image forming apparatus according to claim 1, wherein the circuitry is configured to cause the image former to perform the primary-color image formation and the secondary-color image formation such that the colorant of the primary color is placed on the colorant of the secondary color on a recording medium on which an image is to be formed.

3. The image forming apparatus according to claim 1, further comprising a selector to select the colorant of the secondary color,
wherein the colorant of the primary color is black toner, and
wherein the colorant of the secondary color is cyan toner or magenta toner, and
wherein the selector selects whether to use cyan toner or magenta toner for the colorant of the secondary color.

4. The image forming apparatus according to claim 1, further comprising
a toner remaining amount sensor to detect a remaining amount of the colorant of the primary color,
wherein the circuitry is configured to adjust a ratio between an amount of the colorant of the primary color used in the primary-color image formation and an amount of the colorant of the secondary color used in the secondary-color image formation according to the remaining amount of the colorant of the primary color detected by the toner remaining amount sensor.

5. The image forming apparatus according to claim 1, further comprising
at least one of an environment sensor and an operational life sensor of the image former, and
wherein the circuitry is configured to adjust a ratio between an amount of the colorant of the primary color used in the primary-color image formation and an amount of the colorant of the secondary color used in the secondary-color image formation according to a detection result of the at least one of the environment sensor and the operational life sensor.

6. The image forming apparatus according to claim 1,
wherein the circuitry is configured to extract a character portion in an image, and
wherein the circuitry is configured to cause the image former to perform the two-color image formation only on the character portion extracted by the circuitry.

7. The image forming apparatus according to claim 1, further comprising a storage,
wherein the circuitry is configured to extract a photograph portion in an image and determine a subject of the photograph portion extracted;
wherein the storage stores data of a combination of the primary color and the secondary color for the subject in the photograph portion extracted; and
wherein the circuitry is configured to cause the image former to perform the two-color image formation on the subject in accordance with the data stored in the storage.

8. An image forming apparatus comprising:
an image former to form an image with colorants of different colors; and
circuitry configured to:
determine whether there is a possibility that a shortage of a colorant adhesion amount occurs in primary-color image formation using a colorant of a primary color; and
cause the image former to form an image to be formed using at least two colorants including the colorant of the primary color and a colorant of a secondary color different from the colorant of the primary color, with only one colorant different from the colorant of the primary color, when the circuitry determines that there is a possibility that the shortage of the colorant adhesion amount occurs in the primary-color image formation using the colorant of the primary color,
wherein the circuitry is configured to detect a ratio of a portion to which the colorant of the primary color is to be adhered in a sub-scanning direction in the image to be formed with the colorant of the primary color, and
wherein the circuitry is configured to adjust a ratio between an amount of the colorant of the primary color used in the primary-color image formation and an amount of the colorant of the secondary color used in the secondary-color image formation, according to the ratio of the portion to which the colorant of the primary color is to be adhered.

\* \* \* \* \*